(12) United States Patent
VanderPloeg et al.

(10) Patent No.: US 6,567,143 B1
(45) Date of Patent: *May 20, 2003

(54) NW TWISTED NEMATIC LCD WITH NEGATIVE AND TILTED RETARDERS ON EACH SIDE OF LIQUID CRYSTAL CELL TO IMPROVE VERTICAL CONTRAST RATIOS

(75) Inventors: John A. VanderPloeg, Highland, MI (US); Gang Xu, Cupertino, CA (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/066,827

(22) Filed: Apr. 28, 1998

Related U.S. Application Data

(63) Continuation-in-part of application No. 08/869,973, filed on Jun. 5, 1997, now abandoned, and a continuation-in-part of application No. 08/876,043, filed on Jun. 13, 1997, now Pat. No. 5,895,106.

(51) Int. Cl.$^7$ .............................................. G02F 1/1335
(52) U.S. Cl. ...................................... 349/120; 349/118
(58) Field of Search ................................ 349/117, 118, 349/120

(56) References Cited

U.S. PATENT DOCUMENTS

| | | | |
|---|---|---|---|
| 5,227,903 A | 7/1993 | Miyazawa et al. ........... 349/118 |
| 5,430,565 A | 7/1995 | Yamanouchi et al. ........ 349/117 |
| 5,504,603 A | 4/1996 | Winker et al. ............... 349/117 |
| 5,557,434 A | 9/1996 | Winker et al. ............... 349/117 |
| 5,559,618 A | 9/1996 | Mori ........................... 349/117 |
| 5,570,214 A | 10/1996 | Abileah et al. .............. 349/117 |
| 5,576,861 A | 11/1996 | Abileah et al. .............. 349/117 |
| 5,583,677 A | 12/1996 | Ito et al. ...................... 349/118 |
| 5,583,679 A | 12/1996 | Ito et al. ...................... 349/118 |
| 5,589,963 A | 12/1996 | Gunning, III et al. ....... 349/119 |
| 5,594,568 A | 1/1997 | Abileah et al. .............. 349/120 |
| 5,612,801 A | 3/1997 | Winker ........................ 349/119 |
| 5,619,352 A | 4/1997 | Koch et al. .................. 349/118 |
| 5,895,106 A | * 4/1999 | Vanderploeg et al. ....... 349/120 |
| 5,990,997 A | * 11/1999 | Jones et al. .................. 349/120 |

FOREIGN PATENT DOCUMENTS

| | | |
|---|---|---|
| EP | 0679921 | 11/1995 |
| EP | 0774682 | 5/1997 |
| JP | 63239421 | 10/1988 |
| JP | 366915 | 3/1991 |

OTHER PUBLICATIONS

Patent Abstracts of Japan, 07253573, Mar. 10, 1995.

WO96/15473, Pub. Date May 23, 1996—PCT.

\* cited by examiner

*Primary Examiner*—Robert H. Kim
*Assistant Examiner*—Dung Nguyen
(74) *Attorney, Agent, or Firm*—Michael Best & Friedrich LLC; Larry L. Saret

(57) ABSTRACT

A normally white twisted nematic (TN) liquid crystal display (LCD) outputs improved viewing characteristics which are defined by high contrast ratios and/or reduced inversion. The display includes a pair of negative tilted retarders located on opposite sides of the liquid crystal layer, each of the tilted retarders including a tilt or incline angle which varies throughout the thickness of the layer. Additionally, one or two negative uniaxial or biaxial retarders are provided. As a result of the particular orientations, alignments, and retardation values described in the different embodiments herein, the display exhibits improved contrast and reduced inversion, often in the same viewing areas. Contrast ratio in the positive vertical viewing zone is especially improved.

19 Claims, 5 Drawing Sheets

US 6,567,143 B1

NW TWISTED NEMATIC LCD WITH NEGATIVE AND TILTED RETARDERS ON EACH SIDE OF LIQUID CRYSTAL CELL TO IMPROVE VERTICAL CONTRAST RATIOS

This application is a continuation-in-part (CIP) of U.S. Ser. No. 08/869,973, filed Jun. 5, 1997 now abandoned, and of U.S. Ser. No. 08/876,043, filed Jun. 13, 1997, now U.S. Pat. No. 5,895,106 the disclosures of which are hereby incorporated herein by reference.

This invention relates to a normally white (NW) liquid crystal display (LCD) including tilted and negative retardation films or retarders. More particularly, this invention relates to a NW twisted nematic (TN) LCD including a pair of tilted retarders arranged in a manner so as to provide improved contrast at vertical viewing angles and reduce gray level inversion.

RELATED APPLICATIONS

This application is related to commonly owned U.S. Pat. Nos. 5,576,861; 5,594,568; and 5,570,214; and U.S. Ser. Nos. 08/559,275, filed Nov. 15, 1995; U.S. Ser. No. 08/711,797, filed Sep. 10, 1996, U.S. Ser. No. 08/768,502, filed Dec. 18, 1996, U.S. Ser. No. 08/869,973, filed Jun. 5, 1997, and U.S. Ser. No. 8/876,043, filed Jun. 13, 1997, the entire disclosures of which are all hereby incorporated herein by reference. Each of these commonly owned applications and/or patents relates to a liquid crystal display with specific retarder values, contrast ratios, retarder positions or orientations, and/or retarder types.

BACKGROUND OF THE INVENTION

Informational data in liquid crystal displays (LCDs) is presented in the form of a matrix array of rows and columns of numerals or characters (e.g. pixels) which are generated by a number of segmented pixel electrodes arranged in a matrix pattern. The segments are connected by individual leads to driving electronics which apply a voltage to the appropriate combination of segments and adjacent liquid crystal (LC) material in order to display the desired data and/or information by controlling the light transmitted through the liquid crystal (LC) material.

Contrast ratio (CR) is one of the most important attributes considered in determining the quality of both normally white (NW) and normally black (NB) LCDS. The contrast ratio (CR) in a normally white display is determined in low ambient conditions by dividing the "off-state" light transmission (high intensity white light) by the "on-state" or darkened transmitted intensity. For example, if the "off-state" transmission is 200 fL at a particular viewing angle and the "on-state" transmission is 5 fL at the same viewing angle, then the display's contrast ratio at that particular viewing angle is 40 (or 40:1) for the particular driving voltages utilized.

Accordingly, in normally white LCDs, a significant factor adversely limiting contrast ratio is the amount of light which leaks through the display in the darkened or "on-state." In a similar manner, in normally black displays, a significant factor limiting the contrast ratio achievable is the amount of light which leaks through the display in the darkened or "off-state." The higher and more uniform the contrast ratio of a particular display over a wide range of viewing angles, the better the LCD in most applications.

Normally black (NB) twisted nematic displays typically have better contrast ratio contour curves or characteristicsthan do their counterpart NW displays (i.e. the NB image can often be seen better at large or wide viewing angles). However, NB displays are optically different than NW displays and are much more difficult to manufacture due to their high dependence on the cell gap or thickness "d" of the liquid crystal layer as well as on the temperature of the liquid crystal (LC) material itself. Accordingly, a long-felt need in the art has been the ability to construct a normally white (NW) display with high contrast ratios over a large range of viewing angles, rather than having to resort to the more difficult and expensive to manufacture NB displays in order to achieve these characteristics.

What is often needed in NW LCDs is an optical compensating or retarding element(s), i.e. retardation film(s), which introduces a phase delay that restores the original polarization state of the light, thus allowing the light to be substantially blocked by the output polarizer (analyzer) in the "on-state." Optical compensating elements or retarders are known in the art and are disclosed, for example, in U.S. Pat. Nos. 5,184,236; 5,189,538; 5,406,396; 4,889,412; 5,344,916; 5,196,953;: 5,138,474; and 5,071,997.

The disclosures of U.S. Pat. Nos. 5,570,214 and 5,576,861 (incorporated herein by reference) in their respective "Background" sections illustrate and discuss contrast ratio, and driving voltage versus intensity (fL) graphs of prior art NW displays which are less than desirable. Prior art NW LCD viewing characteristics are problematic in that, for example, their contrast ratios are limited horizontally and/or vertically (and are often non-symmetric), and their gray level performance lacks consistency.

Gray level performance, and the corresponding amount of inversion, are also important in determining the quality of an LCD. Conventional active matrix liquid crystal displays (AMLCDs) typically utilize anywhere from about 8 to 64 different driving voltages. These different driving voltages are generally referred to as "gray level" voltages. The intensity of light transmitted through the pixel(s) or display depends upon the driving voltage utilized. Accordingly, conventional gray level voltages are used to generate dissimilar shades of color so as to create different colors and images when, for example, the shades are mixed with one another.

Preferably, the higher the driving voltage in a normally white display, the lower the intensity (fL) of light transmitted therethrough. The opposite is true in NB displays. Thus, by utilizing multiple gray level driving voltages, one can manipulate either a NW or NB LCD to emit desired intensities and shades of light/color. A gray level voltage $V_{ON}$ is generally known as any driving voltage greater than $V_{th}$ (threshold voltage) up to about 3.0 to 6.5 volts, although gray level voltages may be as low as 2.0 in certain applications.

U.S. Pat. Nos. 5,576,861 and 5,570,214 discuss, in their respective "Background" sections, prior art NW LCDs with inversion problems (e.g. inversion humps). As discussed therein, inversion humps are generally undesirable.

U.S. Pat. No. 5,583,679 discloses an LCD including an optical compensating sheet that includes a discotic structure and negative birefringence, with the discotic structure unit having an inclined plane. Unfortunately, the contrast ratios and inversion characteristics resulting from displays of the '679 patent have been found by the instant inventors to be less than desirable. Certain embodiments of the instant invention described herein exhibit surprisingly improved results with respect to contrast ratio and/or inversion as compared to the '679 patent.

In the prior art, some have been able to separately and independently reduce inversion or improve contrast in given viewing zones, but typically if contrast is improved upon, then inversion characteristics suffer. To date, those in the art have been unable to improve both contrast and inversion in the same viewing area of a display as taught below in accordance with the instant claimed invention.

The examples set forth in U.S. Application Ser. No. 08,876,043, incorporated herein be reference, have excellent viewing characteristics. However, it has been surprisingly found by the instant inventors that contrast ratios can be improved in the vertical viewing region(s) by the inventions set forth herein.

It is apparent from the above that there exists a need in the art for a normally white TN liquid crystal display wherein the viewing zone of the display has high contrast ratios and/or little or no inversion over a wide range of viewing angles, and wherein contrast ratios may be improved in vertical region(s). Furthermore, there exists a need in the art for improved contrast and reduced inversion in the same viewing zone (e.g. in the upper vertical viewing zone principally utilized by pilots of aircraft in avionic applications).

The term "rear" when used herein but only as it is used to describe substrates, polarizers, electrodes, buffing films or zones, and orientation films means that the described element is on the backlight side of the liquid crystal material, or in other words, on the side of the LC material opposite the viewer.

The term "front" when used herein but only as it is used to describe substrates, polarizers, electrodes, buffing films or zones and orientation films means that the described element is located on the viewer side of the liquid crystal material.

Unless otherwise specified, the actual LCDs and/or light valves made and/or tested herein included a liquid crystal material with a birefringent value (Δn) of 0.0854 at room temperature, Model No. ZLI-4718 obtained from Merck.

Unless otherwise specified, the term "retardation value" as used herein for uniaxial retarders means "d.Δn" of the retardation film or plate, where "d" is the film or plate thickness and "Δn" is the film birefringence (i.e. difference in certain indices of refraction).

For all circular contrast ratio graphs herein, "EZContrast" equipment available from Eldim of Caen, France (ID #204F) was used to develop these graphs. This equipment includes a system for measuring Luminance and Contrast versus viewing angle (incident (polar) and azimuth angle), utilizing 14 bits A/D conversion to give luminance measurements from $\frac{1}{10}$ to 8,000 cd/m$^2$, with an accuracy of 3% and a fidelity of 1%. A temperature regulated CCD sensor with a photopic response (and specially designed lenses) are part of this commercially available Eldim system and corresponding software. The measurement device of this Eldim system includes a specially designed large viewing angle lens system having a numerical aperture of 0.86. The Eldim software is Windows™ 3.1 based, running on any 486 and above PC, supporting DDE interface with other programs.

Unless otherwise specified, all examples herein were carried out at approximate 25° C.

All measured real data herein, in the Examples, included the non-uniform characteristics of the backlight over a range of angles. Backlights are more intense at normal than at wide angles.

SUMMARY OF THE INVENTION

Generally speaking, this invention fulfills the above-described needs in the art by providing a method of making a normally white twisted nematic liquid crystal display comprising the steps of:

providing first and second negative tilted retarders whose tilt or incline angles vary in one direction through the thickness of the retarders;

providing a first negative non-tilted retarder;

disposing a twisted nematic liquid crystal layer between said first and second negative tilted retarders; and orienting said tilted and non-tilted retarders so that the resulting display outputs a contrast ratio of at least about 80:1 at a 0° vertical viewing angle over a horizontal angular span of at least about 50°, and a contrast ratio of at least about 50:1 at a viewing angle of 0° horizontal and +40° vertical.

This invention further fulfills the above-described needs in the art by providing a normally white twisted nematic liquid crystal display comprising:

a twisted nematic liquid crystal layer for twisting at least one normally incident wavelength of visible light from about 80°–100° when in the off-state;

front and rear orientation means sandwiching said liquid crystal layer therebetween, said front orientation means including at least a front orientation direction and said rear orientation means including at least a rear orientation direction different than said front orientation direction;

first and second tilted retardation members located on opposite sides of said liquid crystal layer, said first tilted retardation member being located on the same side of said liquid crystal layer as said front orientation means, and said second tilted retardation member being located on the same side of said liquid crystal layer as said rear orientation means;

a first negative retardation member located on the rear side of said liquid crystal layer between said liquid crystal layer and said second tilted retardation member;

each of said first and second tilted retardation members having an optical axis defining an azimuthal angle, and a polar or inclined angle which varies through the thickness of the member; and wherein said azimuthal angle of said first tilted retardation member is oriented parallel within about ±10° relative to said front orientation direction so that said azimuthal angle of said first tilted retardation member and said front orientation direction are oriented in substantially the same direction, and said azimuthal angle of said second tilted retardation member is oriented parallel within about ±10° relative to said rear orientation direction, and said azimuthal angle of said second tilted retardation member is parallel within ±10° relative to a transmission axis of said rear polarizer.

In certain embodiments, the negative non-tilted retardation layer(s) being defined by one of: (i) $n_x > n_y > n_z$; and (ii) $n_x = n_y > n_z$.

In certain embodiments, each tilted retarder has a retardation value $d.(n_e - n_o)$ of from about −20 to −200 nm, and preferably from about −50 to −150 nm, and most preferably from about −100 to −150 nm.

This invention will now be described with respect to certain embodiments thereof, along with reference to the accompanying illustrations, wherein:

DETAILED DESCRIPTION OF CERTAIN EMBODIMENTS OF THIS INVENTION

Figure 1:
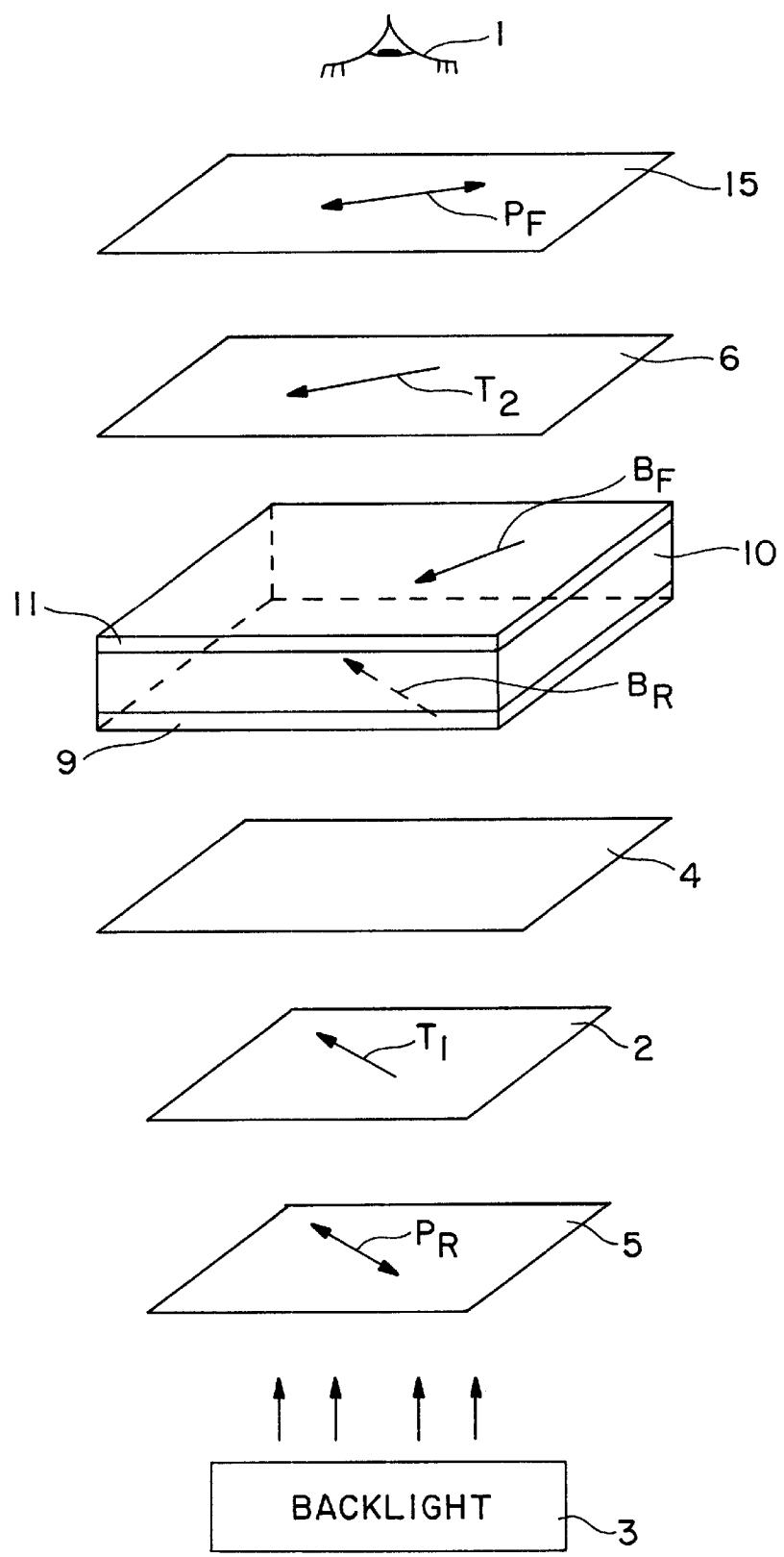
FIG. 1 is a schematic diagram of the optical components of a normally white (NW) twisted nematic (TN) liquid crystal display (LCD) including a pair of negative tilted retarders and a non-tilted negative approximately uniaxial retarder (e.g..C-plate), according to an embodiment of this invention.

Referring now more particularly to the accompanying drawings in which like reference numerals indicate like parts throughout the several views.

FIG. 1 is an exploded schematic view of the optical components, and their respective orientations, of a twisted nematic NW LCD according to a first embodiment of this invention, this LCD being either a light valve (LV) or an AMLCD having a matrix array of pixels and colored .(e.g. RGB, RGBG, RGGB, or RGBW) subpixels therein according to different embodiments of this invention. As shown, this display includes from the rear forward toward viewer 1, conventional backlight 3, rear or light-entrance linear polarizer 5, first rear tilted negative uniaxial retarder 2, first rear preferably negative non-tilted retarder 4 (which may be either uniaxial or biaxial including indices of refraction $n_x$, $n_y$, and $n_z$), rear buffing or orientation film 9, twisted nematic (TN) liquid crystal (LC) layer 10, front buffing or orientation film 11, second or front tilted negative uniaxial retarder 6, and finally front or light-exit linear polarizer 15 (analyzer). Images from the LCD or LV are viewed by viewer 1.

Glass substrates (discussed below) are located on opposite sides of liquid crystal layer 10 so as to be disposed, for example, between the respective orientation films and their adjacent polarizers. Driving electrodes are disposed on and between the substantially transparent substrates and their adjacent orientation layers.

A key to our invention is the surprise finding that when the negative tilted retarders 2 and 6 and optionally negative retarder(s) 4 are placed as illustrated or closely aligned thereto, and are within a particular retardation value(s) range and/or ratio, and/or are arranged in predetermined positions in the LCD, improved viewing characteristics of the display result. For example, the viewing angle of the LCD with respect to contrast ratio is wider/larger, while inversion is lessened, both in a particular viewing zone in some embodiments such as the positive vertical zone which is so important to aircraft pilots. Pointedly, the FIG. 1 embodiment surprisingly improves vertical viewing angle contrast ratios with respect to Ser. No. 08/876,043.

Retarders 2, 4, and 6 are said to be "negative" as refractive index $n_z$ in each of them is less than both indices $n_x$ and $n_y$ (i.e. negative birefringence). Indices of refraction $n_x$ and $n_y$, while being co-planar, are oriented at a 90° angle relative to one another in the plane(s) of the respective film(s). Index of refraction $n_z$ is perpendicular to the plane defined by the $n_x$ and $n_y$ directions (i.e. the $n_z$ direction is normal to the film plane(s).

Negative non-tilted retarder(s) 4 has a retardation value $d.(n_x-n_z)$ of from about +10 to +180 nm (preferably from about +70 to +130 nm, and most preferably about 100 nm), and a retardation value $d.(n_x-n_y)$ of from about −20 to +20 nm, in certain embodiments [where "d" is the thickness of the retarder or compensator]. Thus, when $d.(n_x-n_y)$=0 nm (or approximately zero), retarder 4 is negative uniaxial and when this value is substantially greater or less than zero the retarder(s) is biaxial negative (it is "negative" because $n_z$ is less than each of $n_x$ and $n_y$). Retarder 4 may be made, for example, of triacetyl cellulose (TAC) having a thickness of about 120 μm or of any of the other similar materials. Otherwise, retarder 4 may alternatively may include, or be made of, any known C-plate material.

Negative tilted anisotropic retarders or compensators 2 and 6 (e.g. made of a compound having a discotic structure unit in its molecule such as a discotic liquid crystalline compound having low molecular weight such as monomer and a polymer obtained by polymerization of a polymeric discotic LC compound) have tilted optical axes $T_1$ and $T_2$, respectively. Each retarder 2 and 6 is from about 1.5 to 3.0 μm thick according to this invention. Because each of axes $T_1$ and $T_2$ are angled relative to both the vertical and horizontal, each defines both: a polar angle (i.e. tilted or inclined angle) which is the angle defined between (i) the direction normal to the disc-like molecules of the retarder, and (ii) the direction normal to the display (i.e. the normal or Z direction); and an azimuth angle which is the direction of projection $T_1$, $T_2$ of the optical axis of a retarder in the x, y, plane, as viewed from the point of view of viewer 1. According to certain embodiments, the polar angle (i.e. tilt angle or inclined angle of the optical axis) of each of retarders 2 and 6 varies (either continuously or intermittently in either direction) throughout the thickness of the retarder layer or film while the azimuthal angle remains substantially constant. For example, the polar angle of one or both of retarders 2 and 6 may vary continuously from about 5° to 65° with increase of distance in-the direction of the depth of the layer. In certain embodiments, the inclined or polar angle varies within the range of from 5° to 85° (preferably from about 10° to 80°) while the minimum polar angle in the film is in the range of from about 0° to 85° (preferably from about 5° to 40°) and the maximum polar angle is from about 5° to 90° (preferably from about 30° to 85°). See U.S. Pat. No. 5,583,679 (the disclosure of which is incorporated herein by reference) for exemplary embodiments of films 2 and 6. Preferably, each tilted retarder 2, 6 is oriented so that the minimum tilt angle is furthest from the LC layer 10 and the maximum tilt angle is closest to the LC layer. The maximum tilt angle in each retarder 2, 6 is provided closest to the corresponding adhesive layer shown in FIG. 3.

In certain preferred embodiments of this invention, it has been found that improved results are obtained by orienting tilted retarder 2 so that the light from backlight 3 hits the low tilt angle side of the retarder(s) 2 first, travels through the retarder(s) and exits retarder 2 via the high tilt side. The opposite is true with retarder 6, where the light which had passed through LC layer 10 hits the high tilt angle side of retarder 6 first, and travels through the retarder 6 and exits via through the low tilt side.

Tilted negative retarders 2 and 6 each include refractive indices $n_x$, $n_y$, and $n_z$, as well as extraordinary refractive index $n_e$ for the optical axis of symmetry of the discotic molecule structure, and ordinary refractive index $n_o$ which is perpendicular to $n_e$ as known in the art. According to certain embodiments of this invention, each of retarders 2 and 6 has an $n_e$ of from about 1.40 to 1.65, preferably from about 1.45 to 1.60, and an $n_o$ of from about 1.45 to 1.70, preferably from about 1.5 to 1.6. Also, each of retarders 2 and 6 has a thickness of from about 1.5 to 3.0 μm, and a Δn (i.e. $n_e-n_o$) value of from about −0.30 to 0.00, preferably from about −0.20 to 0.00, and most preferably from about −0.10 to 0.0.

Furthermore, retarders 2 and 4 may be laminated or otherwise formed together as one unit as discussed in the '679 patent. An orientation and a rubbing layer may be provided between layers 2 and 4.

Retarders 2, 4 and 6 may be obtained from Fuji Photo Film Co., Ltd., Japan, or alternatively from Nitto Denko America, with tilted retarders 2 and 6 as WV-film.

Backlight 3 is conventional in nature and emits substantially collimated, or alternatively diffused, light toward the display panel. Backlight 3 may be, for example, the backlighting assembly disclosed in U.S. Pat. No. 5,161,041, the disclosure of which is hereby incorporated herein by reference. Other known conventional high intensity substantially collimated or diffuse backlight assemblies may also be used.

Rear and front polarizers, 5 and 15 respectively, may be iodine based absorption and linear in nature according to certain embodiments of this invention, and their respective linear transmission axes $P_R$ and $P_F$ are oriented perpendicular to one another (i.e. about 90° from one another ± within about 10° (i.e. substantially perpendicular) in either direction) so that LCDs and LVs of the different embodiments of this invention are of the normally white (NW) twisted nematic (TN) type. Therefore, when a driving voltage (e.g. 0.0 or 0.1 V) below the threshold voltage $V_{th}$ is applied by the opposing electrodes across liquid crystal (LC) layer 10, transmission axes $P_R$ and $P_F$ of polarizers 5 and 15, respectively, are oriented such that the light emitted from backlight 3 proceeds through and is linearly polarized in direction $P_R$ by rear polarizer 5, is then twisted (e.g. from about 80° to 100°, preferably about 90°) by twisted nematic LC layer 10, and finally exits front polarizer or analyzer 15 via transmission axis $P_F$ thus reaching viewer 1 with an image. The light reaches viewer 1 because its polarization direction upon reaching front polarizer 15 is similar to the direction defined by transmission axis $P_F$. Thus, a NW display or pixel to which a voltage less than $V_{th}$ is applied is said to be in the "off-state" and appears white (or colored if color filters are present) to the viewer. These conventional polarizers 5 and 15 are commercially available from, for example, Nitto Denko America, as #G1220DUN.

However, when a substantial driving voltage (i.e. gray level voltage or full voltage greater than the threshold voltage $V_{th}$) is applied across the LC of selected NW pixels of the LCD matrix array, the light transmitted through rear polarizer 5 is not twisted as much by LC layer 10 and thus is at least partially blocked by front polarizer 15 due to the fact that the polarization direction of light reaching the interior surface of front polarizer 15 is substantially perpendicular (or otherwise non-aligned) to transmission axis $P_F$, thereby resulting in substantially no, or a lessor amount of, light reaching viewer 1 by way of the selected pixel(s) to which the substantial driving voltage (e.g. from about 3.0–6.5 volts) is applied. Thus, driven pixels in the LCD appear darkened to viewer 1, these pixels said to be in the "on-state." The shade of darkness depends upon the degree or level of voltage applied.

In certain embodiments of this invention, transmission axis $P_R$ and transmission axis $P_F$ are oriented in a manner substantially perpendicular to one another as discussed above. However, polarizers 5 and 15 may alternatively be oriented in other manners which also render the display of the NW type.

Important aspects of this invention which result in the improved viewing characteristics (better contrast and less inversion) disclosed herein include (i) the substantially parallel orientation (i.e. within ±10° from parallel in either direction) of the azimuthal angle of axis $T_2$ of tilted retarder 6 relative to front buffing or orientation direction $B_F$; (ii) each of the rear and front polarizers 5 and 15 having its transmission axis aligned parallel ±10° (i.e. substantially parallel) to the corresponding buff or alignment direction ($B_R$, $B_F$) on the same side of the LC layer; (iii) each of tilted retarders 2 and 6 being oriented so that the side having the largest or maximum tilt angle is closest to the liquid crystal layer 10, and the minimum tilt side is farthest from the LC layer; (iv) the substantial perpendicular orientation of axes $T_1$ and $T_2$ (with respect to azimuthal angle); and (v) the azimuthal aspect of the optical axis ($T_1$ and $T_2$) of each tilted retarder substantially parallel (±10° from parallel) relative to its most closely adjacent buffing or orientation direction. For example, in FIG. 1, the azimuthal aspect of $T_2$ is substantially parallel to $B_F$.

Rear and front orientation or buffing films 9 and 11, respectively, are each from about 250–500 Å thick, and may be made of a substantially transparent polyimide material as is known in the art. Rear LC orientation film 9 is conventionally buffed or oriented in direction $B_R$ as shown in FIGS. 1–11. Likewise, front LC orientation film 11 is conventionally buffed in direction $B_F$. Buffing directions $B_R$ and $B_F$ are oriented substantially perpendicular to one another so as to allow the molecules of liquid crystal layer 10, when in the off or non-driven state, to be twisted from about 80° to 100°, preferably about 90°. Also, it is pointed out that the instant invention may be used in conjunction with multi-domain [e.g. two-domain] alignment applications.

Liquid crystal layer 10 has a thickness "d" of from about 3.5 to 6.5 μm according to certain embodiments, preferably from about 4.0 to 5.0 μm. LC layer 10 has a birefringent value Δn of from about 0.08 to 0.10 according to certain embodiments, preferably from about 0.084 to 0.086 at room temperature.

Figure 2:
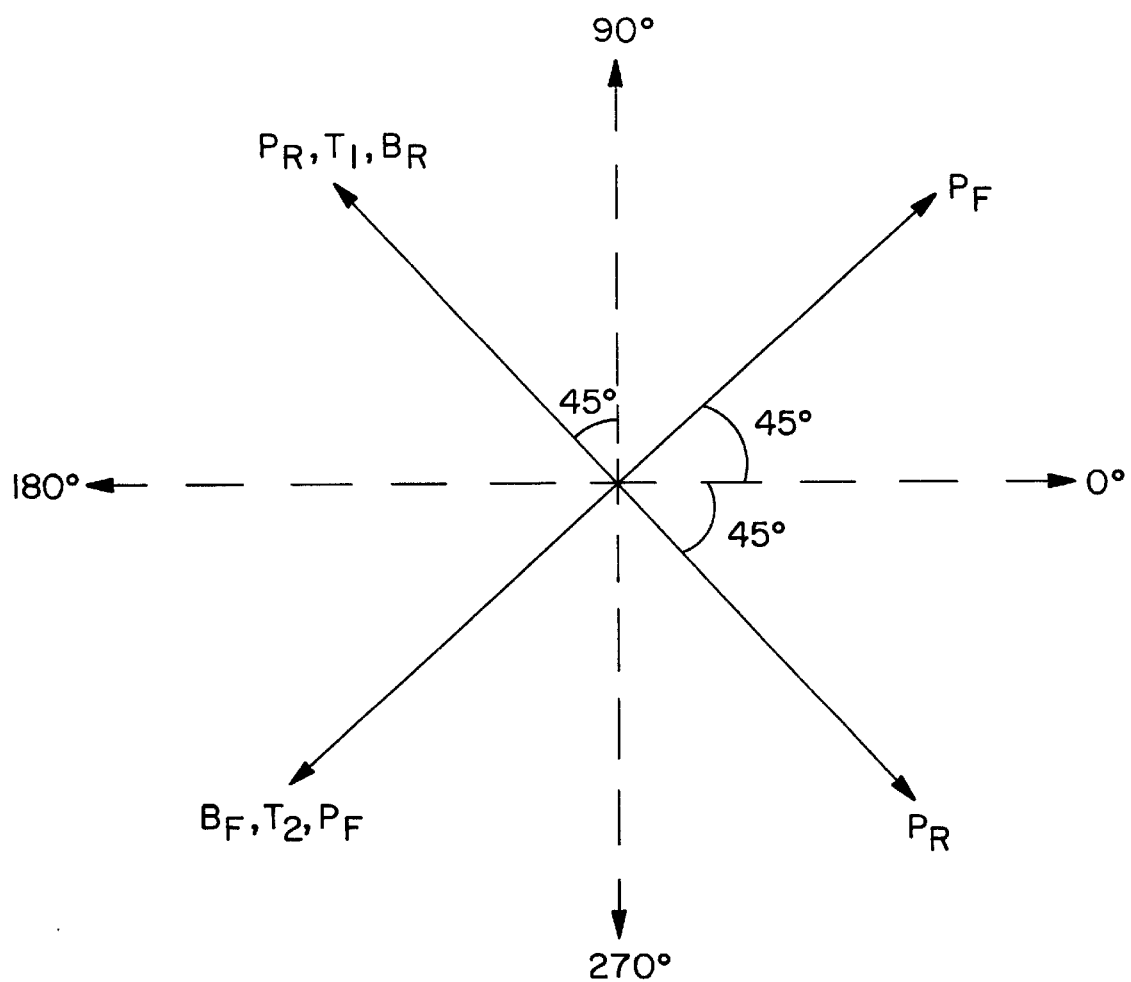
FIG. 2 illustrates the angular relationship between the respective axes of the optical components of the FIG. 1 embodiment, as viewed from the point of view of the viewer 1 (i.e. as viewed from the front of the display).

Negatively birefringent tilted retardation plates or films, 2 and 6, with tilted and azimuthal angled optical axes $T_1$ and $T_2$ respectively (i.e. axes), in the FIG. 1–2 embodiment are disposed on opposite sides of LC layer 10 in certain embodiments to improve symmetry of contrast ratio. Retarder 4 may be on the rear side of the LC layer as shown in FIG. 1, but alternatively may be located on the front side of the LC layer. Also, more than one such retarder 4 may be provided, either on the same side and adjacent retarder 4, or on the side of the LC layer opposite retarder 4.

Negative retarder 4 is defined by either the characteristic $n_x > n_y > n_z$, or alternatively $n_x = n_y > n_z$, where $n_x$, $n_y$, and $n_z$ are respective indices of refraction, and the "z" direction is substantially perpendicular to the film plane while the "x" and "y" directions are substantially parallel to the film plane and perpendicular to each other. Negative retarder 4 may either be of the C-plate type ($n_x = n_y > n_z$) or of the biaxial type ($n_x > n_y > n_z$), and may be obtained from Nitto Denko America or Nitto Corporation (Japan), or alternatively from Fuji Photo Film Co., Ltd., Industrials and Products Division, Japan.

According to certain embodiments, the retarders and polarizers herein, may all be separate sheets, although they alternatively may be all integrally formed or laminated together (or even deposited onto one another) with a known laminating material or deposition process according to certain embodiments. Thus, films 2, 4, and may be laminated or otherwise formed together to form a single sheet having negative tilted retarder 2, negative retarder 4, and polarizer 5. Likewise, films 6 and 15 may be formed together as one unit, or separately.

FIG. 2 illustrates the relationship between the FIG. 1 axes, from the point of view of viewer 1. As shown in FIG. 2, transmission axis $P_F$ of front polarizer is substantially perpendicular to axis $P_R$ of rear polarizer 5. In this particular embodiment, the front polarizer axis $P_F$ is aligned at the 45° (and 225°) angle while the rear polarizer axis $P_R$ is at the 135° (and 315°) angle. It should be understood that these angles are exemplary only, and that the front and rear polarizer axes may be aligned at different angles according to other embodiments in this invention, provided that the display is of the normally white type. Still referring to FIG. 2, front buffing direction $B_F$ is perpendicular to rear buffing direction $B_R$. In this particular embodiment, front buffing direction $B_F$ is aligned at 225° while the rear buffing direction $B_R$ is at 135°.

With regard to tilted retarders 2 and 6, the azimuthal angle of retarder 2 (defining axis $T_1$) is substantially perpendicular to the azimuthal angle of retarder 6 (defining axis $T_2$). In this particular embodiment, $T_1$ is aligned at 135° while $T_2$ is aligned at 225°. It is also noted that $T_1$ is substantially perpendicular to $B_F$. According to the FIGS. 1–2 embodiment, $P_F$ and $B_F$ are substantially parallel to one another, while $P_R$, $B_R$, and $T_1$ are also parallel to one another, ± approximately 10° (i.e. substantially parallel).

According to alternative embodiments of this invention, front retarder 6 may be flipped upside down from its FIGS. 1–2 illustrated position so that axis $T_2$ is oriented 180 degrees from its position illustrated in FIGS. 1 and 2.

Figure 3:
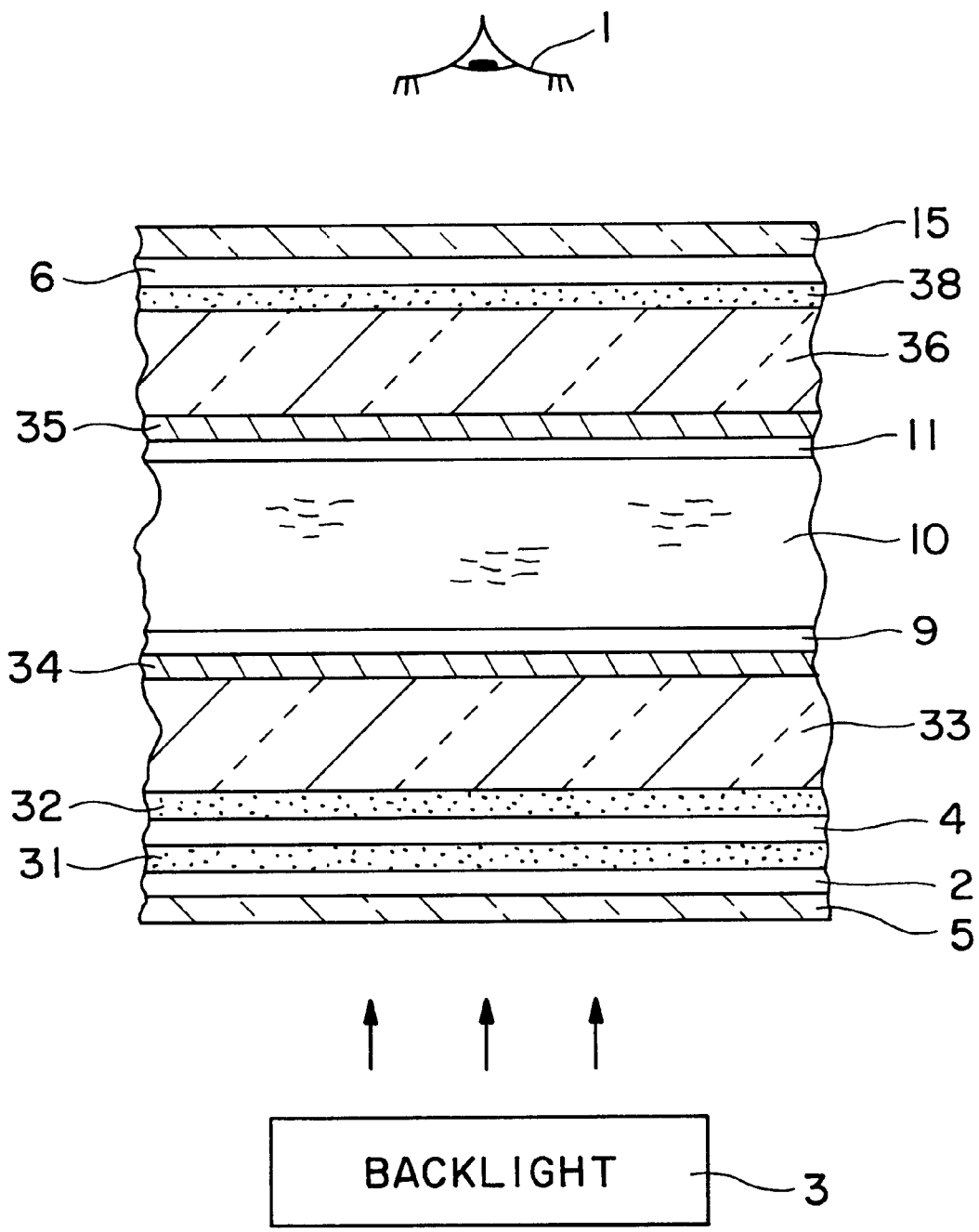
FIG. 3 is a side cross-sectional view of an NW twisted nematic LCD according to the FIGS. 1–2 embodiment.

FIG. 3 is a side cross-sectional view of an NW twisted nematic LCD or LV of FIGS. 1–2, according to certain embodiments of this invention. From the backlight forward, the display includes rear polarizer 5, first negative tilted retarder 2, adhesive layer 31, first negative retarder 4 (either uniaxial or biaxial), adhesive layer 32, substantially transparent glass or plastic substrate 33, conductive electrode(s) 34, rear buffing or orientation film 9, twisted nematic liquid crystal (LC) layer 10, front orientation or buffing film 11, front conductive electrode(s) 35 which functions in conjunction with rear electrode(s) 34 in order to apply voltage across LC layer 10 and/or individual pixels or subpixels defined therein, front substantially transparent glass or plastic substrate 36, adhesive layer 38, second negative tilted retarder. 6, and finally front linear polarizer 15. According to certain embodiments, adhesive layers 31 and 38 abut the tilted retarder layers 2 and 6, respectively, and the polar or inclined angles of retarders 2 and 6 decrease (continuously or intermittently) as a function of the depth or thickness of the retarders as a function of distance from their adjacent adhesive layers 31 and 38, respectively. Thus, the incline or polar angle of the optical axis $T_1$ of retarder 2 may continuously vary, for example, from a maximum of 65° in the area of film 2 adjacent adhesive 31, to 5° adjacent polarizer 5. Thus, in this particular example, the plane of the discotic structure in negative tilted retarder 2 has a planar incline angle that is continuously reduced from a tilt of 65° to one of 5° from the edge of layer 2 closest to adhesive layer 31 to the edge closest to layer 5). Layer 6 has its polar or incline angle vary (continuously or intermittently) in a similar manner, so that the incline from the normal decreases as a function of distance from adhesive layer 38.

Exemplary variations of polar angles for each of retarders 2 and 6 are: (i) from 65° to 5° going away from the adhesive layer that is disposed adjacent the tilted retarder; (ii) from 50° to 20° going away from the adhesive layer that is disposed adjacent the tilted retarder; (iii) from 70° to 20° going away from the adhesive layer adjacent the tilted retarder; and (iv) from 40° to 20° going away from the adhesive layer adjacent the tilted retarder. In certain preferred embodiments, the azimuthal angles of axes $T_1$ and $T_2$ remain substantially constant while the incline angles vary either continuously or intermittently as discussed above.

While FIG. 3 shows the adhesive layer for each tilted retarder being disposed closest to the LC layer 10, this need not be the case in all embodiments. For example, layer 6 (and its adhesive 38) may be flipped over so that the adhesive 38 is between the retarder 6 and polarizer 15.

According to certain embodiments of this invention, the retardation value $d.(n_e-n_o)$ of each of the two tilted negative retarders 2 and 6 is from about −20 to −200 nm, preferably about −50 nm to −150 nm, and most preferably from about −100 nm to −150 nm, and where $n_e<n_o$. In combination with these average tilted retarder values, it has been found that excellent results are achieved when the $d.(n_x-n_z)$ birefringent value (retardation value) of each of negative retardation film(s) 4 is from about 10 to 180 nm, more preferably from about 70 to 130 nm.

According to certain other embodiments, it has been found that improved viewing characteristics result when the retardation values of the tilted 2, 6 and negative 4 retarders are maintained within a particular ratio range. The absolute value ratio of the average retardation values $d.(n_e-n_o)$ of each or one of negative tilted retarders 2 and 6 to the retardation value $d.(n_x-n_z)$ of each or one of retarders 4 is from about 1:1 to 3:1 (more preferably from about 1.0:1 to 2.0:1) according to certain embodiments. The retardation values of each of the like (e.g. tilted) retarders need not be identical, but the ratio range is typically met by both sets of retardation values.

This invention will now be described with respect to certain examples as follows each conducted at approximately 25° C. unless otherwise specified. In each of the two examples set forth below, unless otherwise indicated, the liquid crystal layer had a Δn (or birefringent value) of 0.0854, the thickness "d" of LC layer 10 in each LCD was substantially constant across the entire viewing area, the front and rear linear polarizers 5 and 15 were linear and each included both an iodined PVA layer and a TAC layer on each side of the PVA as known in the art, and the retarders 2, 4, and 6 were all present substantially as illustrated in FIGS. 1 and 2. The tilted retarders 2, 6 had angles which varied as described above when the corresponding adhesive was located between the LC layer 10 and the retarder at issue.

EXAMPLE 1

In this first Example, a normally white active matrix LCD (AMLCD) was constructed as shown in FIGS. 1–3. This display had, from the rear forward, rear polarizer 5 having a PVA layer and a pair of TAC layers [NPF-G1220DUN] first tilted retarder 2, first non-tilted negative retarder 4, rear orientation film 9, LC layer 10, front orientation film 11, retarder 6, and finally front polarizer 15 [NPF-G1220DUN]. The thickness "d" of LC layer 10 was about 5 μm and the Δn value of LC layer 10 was 0.0854. The incline or tilt angle of each of retarders 2 and 6 varied throughout the thickness of the layers approximately from 60°–70° on the side closest to LC layer 10 down to approximately 5° on the side furthest from liquid crystal layer 10. In other words, the tilt or incline angle of retarder 2 was from about 60°–70° on the side of this layer furthest from polarizer 5 and it continuously varied down to approximately 5° on the side of the layer closest to polarizer 5. Non-tilted retarder 4 was about 1.1 μm thick and was defined approximately by $n_x = n_y > n_z$ (C-plate). Meanwhile, each of retarders 2 and 6 were about 2.1 μm thick. The respective axes of the different optical components of this AMLCD were oriented approximately as shown in FIG. 2. The tilted retarders were obtained from Fuji as its WV film.

Figure 4:
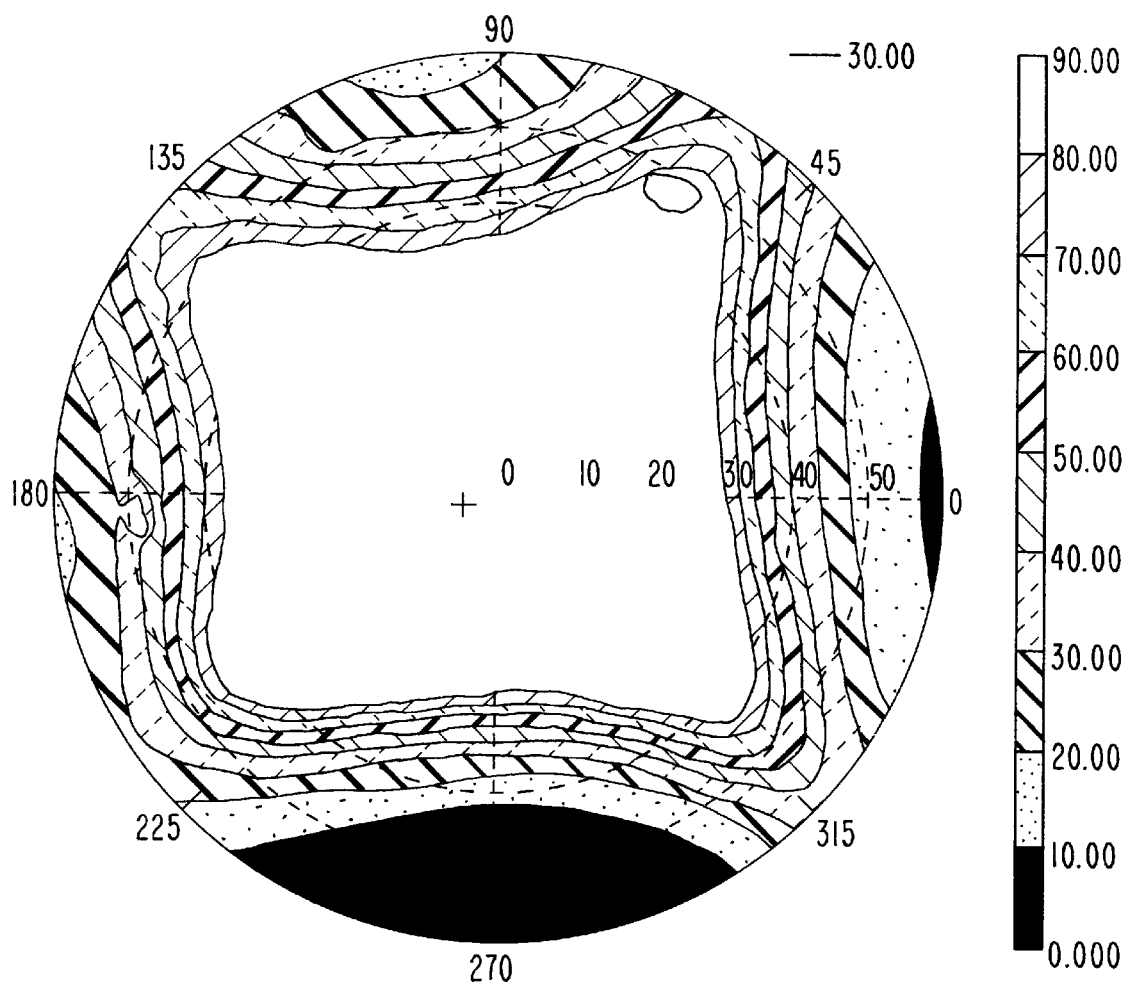
FIG. 4 is a light contrast ratio contour graph of the NW TN light valve of Example 1 herein.

FIG. 4 is a white light contrast ratio graph of the AMLCD of this first Example when about 6 volts were applied to the display in the on-state and about 1.8 volts in the off-state. As can be seen, this AMLCD exhibited excellent contrast ratios throughout the viewing zone. The maximum measured contrast ratio, at the "+", was 192.48, while the minimum was 1.45.

As shown in this first example, FIG. 4, the contrast ratios were very good at high vertical viewing angles not close to the 0,0 (i.e. normal) viewing angle. For example, this AMLCD, as shown in FIG. 4, exhibited a contrast ratio of at least about 80:1, along the zero degree vertical viewing axis, along a horizontal angular span of at least about 60 degrees. The display also exhibited a white light contrast ratio of at least about 80:1 over a vertical angular span, along the zero degree horizontal viewing axis, of at least about 50 degrees. Still further, the display exhibited at least a 30:1 contrast ratio over a vertical viewing angle span, along the zero degree horizontal viewing axis, of from about −33 degrees up to about +46 degrees. Thus, along the 0 degrees horizontal axis, the display had at least about a 30:1 contrast ratio over a vertical span of at least about 79 degrees in certain embodiments, preferably over a vertical span of at least about 75 degrees at some horizontal viewing angle, and most preferably over a vertical angular span of at least about 80 or 85 degrees at a predetermined horizontal viewing angle. Also, the display exhibited at least a 50:1 contrast ratio over a vertical angular span of at least about 50:1 at a viewing angle of 0 degrees horizontal, +40 degrees vertical (this viewing angle being in the important positive vertical viewing cone area).

EXAMPLE 2

In this second Example, a normally white active matrix LCD (AMLCD) was constructed as shown in FIGS. 1–3. This display had, from the rear forward, rear polarizer 5 having a PVA layer and a pair of TAC layers [NPF-G1220DUN] first tilted retarder 2, first non-tilted negative retarder 4, rear orientation film 9, LC layer 10, front orientation film 11, retarder 6, and finally front polarizer 15 [NPF-G1220DUN] . The thickness "d" of LC layer 10 was about 5 μm and the Δn value of LC layer 10 was 0.0854. The incline or tilt angle of each of retarders 2 and 6 varied throughout the thickness of the layers approximately from 60°–70° on the side closest to LC layer 10 down to approximately 5° on the side furthest from liquid crystal layer 10. In other words, the tilt or incline angle of retarder 2 was from about 60°–70° on the side of this layer furthest from polarizer 5 and it continuously varied down to approximately 5° on the side of the layer closest to polarizer 5. Non-tilted retarder 4 was about 1.1 μm thick and was defined approximately by $n_x = n_y > n_z$ (C-plate). Meanwhile, each of retarders 2 and 6 were about 2.1 μm thick. The respective axes of the different optical components of this AMLCD were oriented approximately as shown in FIG. 2. The tilted retarders were obtained from Fuji as its WV film.

Figure 5:
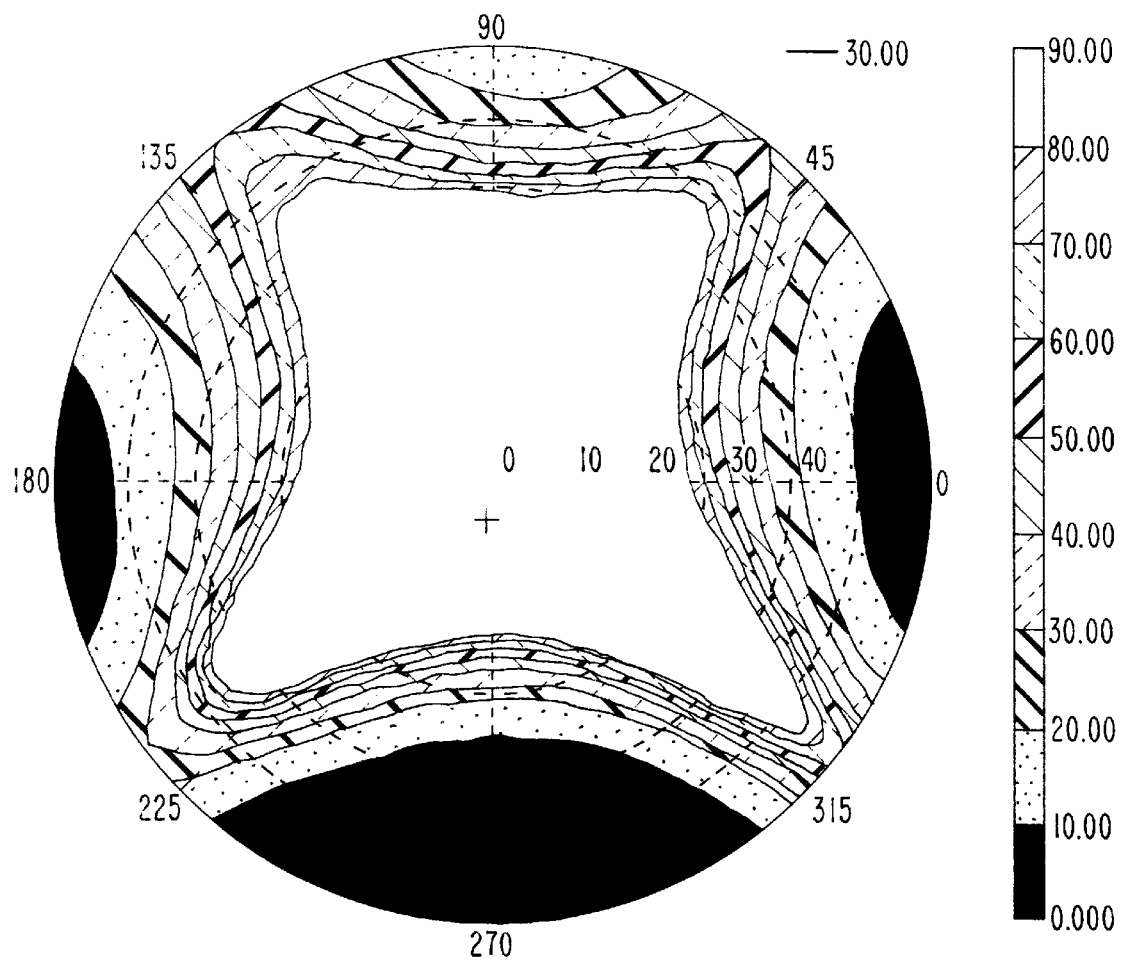
FIG. 5 is a light contrast ratio contour graph of the NW TN AMLCD of Example 2 herein.

FIG. 5 is a white light contrast ratio graph of the AMLCD of this second Example when about 5.6 volts were applied to the display in the on-state and about 0.9 volts in the off-state. As can be seen, this AMLCD exhibited excellent contrast ratios throughout the viewing zone. The maximum measured contrast ratio, at the "+", was 370.28, while the minimum was 0.81.

For example, this AMLCD, as shown in FIG. 5, exhibited a white light contrast ratio of at least about 80:1 over a vertical angular span, along the zero degree horizontal viewing axis, of at least about 60 degrees.

Still further, the display exhibited at least a 30:1 contrast ratio over a vertical viewing angle span, along the zero degree horizontal viewing axis, of from about −26 degrees up to about +47 degrees. Also, the display exhibited at least a 50:1 contrast ratio over a vertical angular span of at least about 50:1 at a viewing angle of 0 degrees horizontal, +45 degrees vertical (this viewing angle being in the important positive vertical viewing cone area).

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A normally white twisted nematic liquid crystal display (LCD) comprising:

a twisted nematic liquid crystal layer for twisting at least one normally incident wavelength of visible light from about 80°–100° when in the off-state;

front and rear orientation means sandwiching said liquid crystal layer therebetween, said front orientation means including at least a front orientation direction and said rear orientation means including at least a rear orientation direction different than said from orientation direction;

first and second tilted retardation members located on opposite sides of said liquid crystal layer, said first tilted retardation member being located on the same side of said liquid crystal layer as said front orientation means, and said second tilted retardation member being located on the same side of said liquid crystal layer as said rear orientation means;

a first negative retardation member located on the rear side of said liquid crystal layer between said liquid crystal layer and said second tilted retardation member;

each of said first and second tilted retardation members having an optical axis defining an azimuthal angle, and a polar or inclined angle which varies through the thickness of the member; and wherein said azimuthal angle of said first tilted retardation member is oriented parallel within about ±10° relative to said front orientation direction so that said azimuthal angle of said first tilted retardation member and said front orientation direction are oriented in substantially the same direction, and said azimuthal angle of said second tilted retardation member is oriented parallel within about ±10° relative to said rear orientation direction, and said azimuthal angle of said second tilted retardation member is parallel within ±10° relative to a transmission axis of said rear polarizer.

2. The LCD of claim 1, wherein the azimuthal angle of said first tilted retardation member is oriented perpendicular within ±10° relative to the azimuthal angle of said second tilted retardation member.

3. The LCD of claim 1 wherein said first negative retardation member on the rear side of said liquid crystal layer is non-tilted, and said first negative retardation member being defined by one of (i) $n_x > n_y > n_z$; and (ii) $n_x = n_y > n_z$.

4. The LCD of claim 3, wherein each of said first and second tilted retardation members has a negative birefringence and a retardation value d.($n_e$–$n_o$) of from about –20 to –200 nm.

5. The LCD of claim 1, wherein each of said first and second tilted retardation members is oriented relative to said liquid crystal layer such that the side of each of said tilted retardation members having the largest tilt or incline angle is closest to said liquid crystal layer.

6. A normally white twisted nematic liquid crystal display comprising:

a liquid crystal layer for twisting at least one normally incident visible wavelength of light as it passes therethrough when said liquid crystal layer is in substantially the off-state so as to define a twisted nematic normally white display;

rear and front orientation layers each having a different alignment direction;

at least one negative retarder means located on one side of said liquid crystal layer and having a retardation value d.($n_x$–$n_z$) of from about 10 nm to 150 nm and a retardation value d.($n_x$–$n_y$) of from about –20 nm to 20 nm;

rear and front polarizers, each having a different transmission axis;

first and second negative tilted retarder means on opposite sides of said liquid crystal layer, said first negative tilted retarder means being located on the same side of said liquid crystal layer as said front polarizer, each of said first and second tilted retarder means having a retardation value d.($n_e$–$n_o$) of from about –20 to –200 nm;

wherein an azimuthal direction of the retardation axis of said first tilted retarder means is parallel within ±100° to the alignment direction of the orientation layer located on the same side of said liquid crystal layer;

wherein the transmission axis of the rear polarizer is parallel within ±10° to the alignment direction of the rear orientation layer; and wherein the first and second negative tilted retardation means are positioned and oriented in the display so that the display can achieve a contrast ratio of at least about 80:1 along a zero degree vertical viewing axis, over a horizontal angular span of at least about 60 degrees; and a contrast ratio of at least about 80:1 over a vertical angular span, along a zero degree horizontal viewing axis, of at least about 50 degrees.

7. The display of claim 6, wherein the first and second negative tilted retardation means are positioned and oriented in the display so that the display can achieve a white light contrast ratio of at least 30:1 over a vertical viewing angle span, along the zero degree horizontal viewing axis, of from about –33 degrees up to about +46 degrees.

8. The display of claim 6, wherein the first and second negative tilted retardation means are positioned and oriented so that the display can achieve a contrast ratio along the 0 degree horizontal viewing axis of at least about a 30:1 over a vertical span of at least about 80 degrees.

9. The display of claim 8 wherein the first and second negative tilted retardation means are positioned and oriented so that the display can achieve a contrast ratio of at least 50:1 at a viewing angle of 0 degrees horizontal, +40 degrees vertical.

10. A method of making a normally white twisted nematic liquid crystal display comprising the steps of:

providing first and second negative tilted retarders whose tilt or incline angles vary in one direction through the thickness of the retarders;

providing a first negative non-tilted retarder;

disposing a twisted nematic liquid crystal layer between said first and second negative tilted retarders; and orienting said tilted and non-tilted retarders so that the resulting display outputs contrast ratios of at least about 80:1 along a zero degree vertical viewing axis over a horizontal angular span of at least about 50 degrees, and a contrast ratio of at least 50:1 at a viewing angle of 0 degrees horizontal, +40 degrees vertical.

11. A normally white twisted nematic liquid crystal display comprising:

a twisted nematic liquid crystal layer;

first and second negative tilted retarders located on opposite sides of said liquid crystal layer, each of said first and second negative tilted retarders defining a tilt or incline angle which varies in at least one direction throughout the thickness of the layer, a first non-tilted negative retarder located on the same side of said liquid crystal layer as said second tilted retarder;

first and second polarizers located on opposite sides of said liquid crystal layer, said first polarizer being located on the same side of said liquid crystal layer as said first negative tilted retarder;

first and second orientation layers having first and second orientation directions, respectively, said first orientation layer with said first orientation direction being located on the same side of said liquid crystal layer as said first polarizer;

said first polarizer having a transmission axis oriented parallel ±10° (substantially parallel) to said first orientation direction, and said second polarizer having a transmission axis oriented parallel ±10° (substantially parallel) to said second orientation direction; and wherein the transmission axis of said first polarizer is oriented perpendicular ±10° to the azimuthal element of the optical axis of said second tilted retarder, and wherein said first tilted retarder is located in between said first polarizer and said liquid crystal layer.

12. The display of claim 11, wherein said first non-tilted negative retarder is located between said second tilted retarder and said liquid crystal layer.

13. The display of claim 11, wherein said first negative non-tilted retarder has a retardation value d.($n_x$–$n_z$) of from about 10–150 nm and a retardation value d.($n_x$–$n_y$) of from about –20 to –200 nm.

14. The display of claim 11, wherein each of said first and second negative tilted retarders has retardation value d.($n_e$–$n_o$) of from about –20 to –200 nm.

15. The display of claim 14, wherein each of said tilted retarders has a retardation value d.($n_e$–$n_o$) of from about –100 to 150 nm.

16. A normally white twisted nematic liquid crystal display (LCD) comprising:

a twisted nematic liquid crystal layer for twisting at least one normally incident wavelength of visible light from about 80°–100° when in the off-state;

front and rear orientation layers sandwiching said liquid crystal layer therebetween, said front orientation layer including at least a front orientation direction and said rear orientation layer including at least a rear orientation direction different than said front orientation direction;

first and second tilted retardation members located on opposite sides of said liquid crystal layer, said first tilted retardation member being located on the same side of said liquid crystal layer as said front orientation layer, and said second tilted retardation member being located on the same side of said liquid crystal layer as said rear orientation layer;

a first negative retardation member on a rear side of said liquid crystal layer, said first negative retardation member being defined by one of: (i) $n_x > n_y > n_z$; and (ii) $n_x = n_y > n_z$;

each of said first and second tilted retardation members having an optical axis defining an azimuthal angle, and a polar or inclined angle which varies through the thickness of the member; and wherein said azimuthal angle of said first tilted retardation member is oriented parallel within about ±100° relative to said front orientation direction so that said azimuthal angle of said first tilted retardation member and said front orientation direction are oriented in substantially the same direction, and said azimuthal angle of said second tilted retardation member is oriented parallel within about ±10° relative to said rear orientation direction, and said azimuthal angle of said second tilted retardation member is parallel within ±10° relative to a transmission axis of said rear polarizer.

17. The LCD of claim 16, wherein the azimuthal angle of said first tilted retardation member is oriented perpendicular within ±10° relative to the azimuthal angle of said second tilted retardation member.

18. The LCD of claim 16, wherein each of said first and second tilted retardation members has a negative birefringence and a retardation value $d.(n_e - n_o)$ of from about −20 to −200 nm.

19. The LCD of claim 16, wherein each of said first and second tilted retardation members is oriented relative to said liquid crystal layer such that the side of each of said tilted retardation members having the largest tilt or incline angle is closest to said liquid crystal layer.

* * * * *